United States Patent
Aomi

(10) Patent No.: US 8,903,131 B2
(45) Date of Patent: Dec. 2, 2014

(54) REAL-TIME CAMERA DICTIONARY

(75) Inventor: Ryota Aomi, Shibuya-ku (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 412 days.

(21) Appl. No.: 13/497,360

(22) PCT Filed: Dec. 7, 2010

(86) PCT No.: PCT/JP2010/007101
§ 371 (c)(1),
(2), (4) Date: Jun. 14, 2012

(87) PCT Pub. No.: WO2011/077648
PCT Pub. Date: Jun. 30, 2011

(65) Prior Publication Data
US 2012/0250943 A1 Oct. 4, 2012

(30) Foreign Application Priority Data
Dec. 25, 2009 (JP) .................. 2009-293667

(51) Int. Cl.
*G06K 9/00* (2006.01)
*G06F 17/28* (2006.01)
*G06K 9/72* (2006.01)

(52) U.S. Cl.
CPC .......... *G06F 17/289* (2013.01); *G06K 9/00671* (2013.01); *G06K 9/72* (2013.01)
USPC .......................................... 382/103; 382/177

(58) Field of Classification Search
CPC ............................................ G06K 9/00671
See application file for complete search history.

(56) References Cited

U.S. PATENT DOCUMENTS

| | | | |
|---|---|---|---|
| 6,884,175 B2 | 4/2005 | Toriyama et al. | |
| 2008/0317346 A1* | 12/2008 | Taub | 382/182 |
| 2009/0110282 A1 | 4/2009 | Tanaka et al. | |

FOREIGN PATENT DOCUMENTS

| | | |
|---|---|---|
| JP | 11-212992 | 8/1999 |
| JP | 2000-152125 | 5/2000 |
| JP | 2003-302996 | 10/2003 |
| JP | 2005-044052 | 2/2005 |
| JP | 2006-146454 | 6/2006 |
| JP | 2006-309314 | 11/2006 |
| JP | 2007-280166 | 10/2007 |
| JP | 2009-110444 | 5/2009 |

OTHER PUBLICATIONS

International Search Report in PCT/JP2010/007101, dated Mar. 8, 2011.
"OCR Function", Manual of W31SA (mobile phone), p. 160 (Mar. 2005).

* cited by examiner

*Primary Examiner* — Bhavesh Mehta
*Assistant Examiner* — Andrew Moyer
(74) *Attorney, Agent, or Firm* — Greenblum & Bernstein, P.L.C.

(57) ABSTRACT

Information display equipment that can display translated words and/or translation information in real time. The information display equipment relates to a camera dictionary that can perform dictionary display in real time. In addition, this equipment distinguishes characters included in an object photographed by a photographing portion. Then this equipment extracts information corresponding to these characters from a dictionary. Examples of the information corresponding to the characters are translated words or illustrative examples for a certain term. Then a display portion displays the information corresponding to the characters.

3 Claims, 8 Drawing Sheets

Fig.5(a)

| 9:00 | JAN | AAA01 | Changi | Singapore | On Board | 11 |
| 9:15 | CHN | ABC11 | Beijin | China | On Board | 13 |
| 9:30 | XXX | HKG10 | HK | Hongkong | On Board | 35 |
| 9:40 | THL | THL12 | Bangkok | Thailand | On Board | 55 |
| 10:00 | JAN | AAA01 | Changi | Singapore | On Board | 41 |
| 10:15 | CHN | ABC11 | Beijin | China | On Board | 43 |
| 10:30 | XXX | HKG10 | HK | Hongkong | On Board | 45 |
| 10:40 | THL | THL12 | Bangkok | Thailand | On Board | 52 |

REAL-TIME CAMERA DICTIONARY

TECHNICAL FIELD

The present invention relates to a camera dictionary that allows the dictionary to display in real time. In more detail, the present invention relates to the camera dictionary that allows real-time response to display new translated words consecutively and automatically as soon as the image that the camera captures is changed.

BACKGROUND ART

In Japanese patent laid-open No. 2000-152,125 official gazette (patent document 1), head-mounted display equipment is disclosed. This equipment captures a composition in front of a user by charge-coupled device camera, interprets sentences or words from image information provided, translates them, and shows them on the display.

In Japanese patent laid-open No. 2007-280,166 official gazette (patent document 2), an electronic dictionary is disclosed. This electronic dictionary converts words or sentences in the center of a visual field into other forms of words or sentences, and then displays them in the visual field of a user.

In page 160 of instruction manual of mobile phone W31SA (non-patent document 1), "Camera de dictionary" service is described. This "Camera de dictionary" service is the one that an OCR function is added to mobile phone. In addition this mobile phone has a function that retrieves, based on the captured photograph, terms with the OCR and translates the retrieved terms.

PRIOR ART PUBLICATION

Patent Document

Patent documents 1: Japanese patent laid-open No. 2000-152, 125 official gazette.
Patent documents 2: Japanese patent laid-open No. 2007-280, 166 official gazette.

Non-Patent Document

Non-patent document 1: Page 160 of instruction manual of mobile phone W31SA.

SUMMARY OF INVENTION

Problems to be Solved by the Invention

Both the equipments disclosed in the patent documents 1 and 2 are the ones that capture certain sentence and/or certain words and then on the basis of them display translated sentences or words on a monitor. On the other hand, there are certain words having different meanings. Therefore there is a problem that these equipments easily lead to mistranslation.

In addition, both the equipments disclosed in the patent documents 1 and 2 display the translated terms in the designated display area. Therefore, there is a problem that it is not easy to comprehend which character is translated when there are plural characters in the view field of a user.

The mobile phone with the OCR function, which is disclosed in the non-patent document 1, retrieves terms with the OCR on the basis of a taken photograph (static image) and then translates the retrieved terms. Because this mobile phone carries out translation on the basis of the static image, there is a problem that it is impossible to translate appropriate terms and to display them in real time.

Therefore, the present invention intends to provide an information display equipment that can display in real time consequently appropriate correspondence information (translated words, translation information) depending on conditions and that enables real-time response.

Moreover the present invention intends to provide the information display equipment that can easily grasp translation objects.

Furthermore, the present invention intends to provide the information display equipment that can incessantly and instantaneously display the correspondence information (translated terms, translation information) with respect to new objects for photography.

Means for Solving the Problem

The present invention is based on a knowledge that it is possible to display appropriate correspondence information depending on conditions by carrying out translation after having grasped a kind of translation object.

The information display equipment of the present invention relates to a camera dictionary that can perform the display of dictionary in real time. In addition, this equipment distinguishes characters included in an object photographed by a photographing portion 11. Then this equipment extracts information corresponding to these characters from a dictionary 12. Examples of the information corresponding to the characters is a translated word or an illustration for a certain term. The display portion 12 displays the information corresponding to the characters. The characters are generally letters. However, the characters may be pictographs, code information, symbols. In addition, an object distinction portion 13 of this equipment distinguishes a kind of object (e.g., document, signboard) photographed in the photographing portion 11. When an information extraction portion 15 extracts the information corresponding to the characters from the dictionary 12, the information with respect to the kind of object as well as the information about the characters are used. By doing so, appropriate correspondence information can be extracted depending on conditions, by displaying, for example, dictionary information published by dictionary for learning in the case that a book has been photographed.

Preferred embodiments of the present invention will be described below. The present invention is not limited by the following examples. The preferred examples of the information display equipment of the present invention is the one that selects appropriate dictionary depending on a kind of object. Then, in this example, by using, for example, color information of the portion except the characters in the object such as background portion (portion of the paper in document) of the characters, the kind of object is distinguished. For example, the object is more likely to be a book if the characters are black and the background portion is white or cream. In that case, for example, the dictionary for learning is selected based on information that the object is document. By doing so, this equipment, for example, can extract and display dictionary information with respect to terms that one wants to know.

A Preferred embodiment of the information display equipment of the present invention is the one that, based on a kind of object distinguished by an object distinct portion (13) and characters distinguished by a character distinct portion 12, an information extraction portion 15 extracts one most appropriate word corresponding to the characters from a dictionary 12. Then, a display portion 16 not only displays the most appropriate word, but also displays to prompt the input of what the most appropriate word displayed is wrong in the case that the most appropriate word displayed is wrong. Then, in the case that the input of what the most appropriate word displayed by the information display equipment is wrong is made, the information extraction portion 15 extracts a word that is different from the most appropriate word corresponding to the characters from the dictionary 12. Then the display portion 16 displays the different word.

By doing so, the information display equipment mentioned above (without minding even if translation of target words is wrong) displays the most appropriate word, which the information display equipment has judged to be the most suitable translation, on the display portion. Performing such a data processing, the most appropriate word for the changing target-word can be displayed by real-time response. Specifically, the photographing portion photographs a photogenic object consecutively, and the most appropriate word for the target word is obtained and then displayed on the display portion before the next photographing is performed after the first photographing has been performed. From this, the most appropriate word can be displayed in a moment when the object has changed.

A preferred embodiment of the information display equipment of the present invention is the one that distinguishes a kind of object according to the direction of the photographing portion. For example, it is thought that if the photographing portion is horizontal or upward to horizontal the user requires translation of not document but scenery and/or signboard. In that case, information selected based on a geographical dictionary and a name dictionary is displayed.

A preferred embodiment of the information display equipment of the present invention is the one that distinguishes a kind of object by input from the user. For example, if the user selects an English-Japanese dictionary mode, the dictionary information including translation from specified English into Japanese is displayed.

A preferred embodiment of the information display equipment of the present invention is the one that displays the photographed object on a screen and displays translated characters on the object in piles. This concrete embodiment is the one that when a signboard written in foreign language is photographed, Japanese sentences that replace the foreign language writings are displayed on the monitor.

In this embodiment, the color of the characters is distinguished and position, dimension, and angular degree in the character display portion 16 are distinguished. In addition, this embodiment distinguishes the color around the characters. Furthermore, the color around the characters before translating covers the characters before translating so that the characters before translating is not displayed on the display portion. In addition, the translated words are displayed corresponding to the characters, based on the position, dimension, angular degree, and the color of the characters in the character display portion 16. By doing so, the words after translating are displayed on the photographed screen in piles.

A preferred embodiment of the information display equipment of the present invention is the one that the display portion 16 is a touch panel. Then in this equipment, when the display portion 16 displays the object and the user instructs the characters included in the object displayed on the touch panel, the characters are identified and distinguished, based on the instruction information.

Advantageous Effects of the Invention

The information display equipment of the present invention can consequently display in real time appropriate correspondence information depending on conditions by performing translation after having grasped a kind of translation object, and then real-time response is enabled.

In addition, in a preferred embodiment of the information display equipment of the present invention, as the words after translating can be displayed overlappingly with the target words, the translation object can be easily grasped.

Furthermore, in a preferred embodiment of the information display equipment of the present invention, as it is not required to let, based on the photograph, the user appoint target words to be translated, correspondence information with respect to new photographing object can be displayed continuously and momentarily.

Furthermore, in a preferred embodiment of the information display equipment of the present invention, one word that is thought to be the most suitable one as a translated term is displayed, and correspondence information with respect to new photographing object can be displayed continuously and momentarily to prompt input to suggest that it is a mistake if the displayed word is wrong.

BRIEF DESCRIPTION OF DRAWINGS

FIG. 5(*a*) shows a display board which is not via the information display equipment. FIG. 5(*b*) is a schematic diagram when characters are covered with background color. FIG. 5(*c*) illustrates a state displaying characters of "中国" that replace "China" on the display board. FIG. 5(*d*) illustrates a state that the characters on the display board are translated.

DESCRIPTION OF EMBODIMENTS FOR CARRYING OUT THE INVENTION

Embodiments for carrying out the present invention is explained on the basis of drawings as follows. The present invention is not limited to the following explanation and includes the one that is appropriately modified under condition that is apparent to person skilled in the art.

Figure 1:
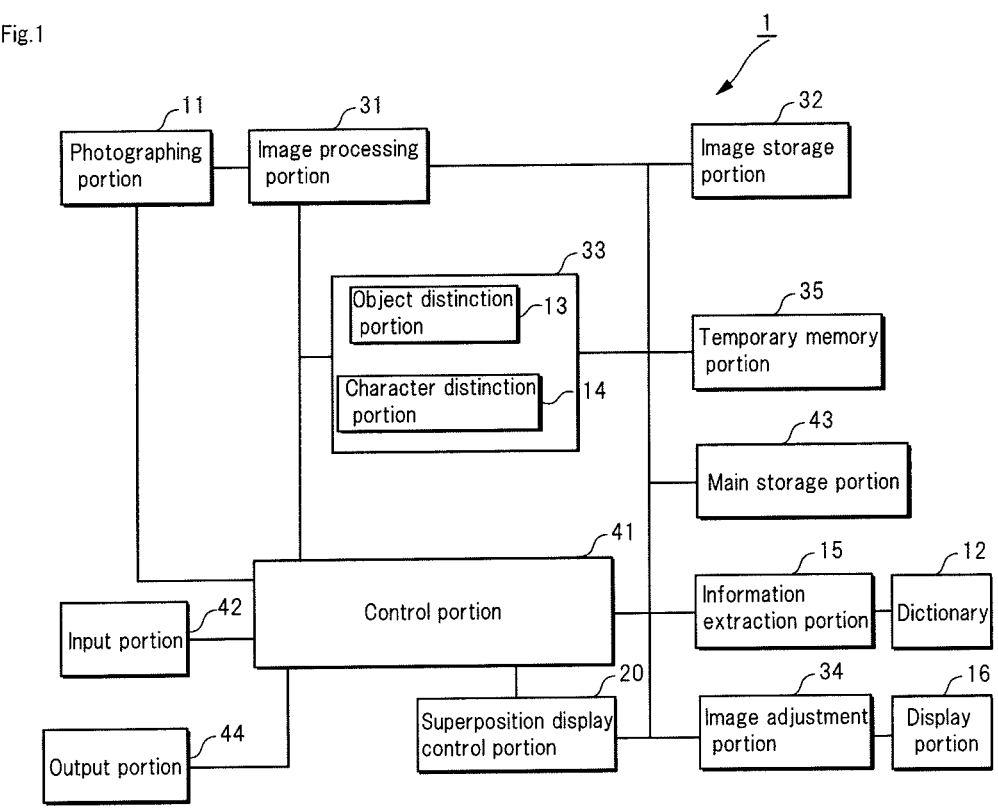
FIG. 1 illustrates a block diagram to explain an information display equipment of the present invention.

FIG. 1 is a block diagram to explain an information display equipment of the present invention. As shown in FIG. 1, the information display equipment 1 of the present invention comprises a photographing portion 11, a dictionary 12, an object distinction portion 13, a character distinction portion 14, an information extraction portion 15, and a display portion 16.

The information display equipment may be any kind of form if it has the photographing portion 11 and the display portion 16. In addition, the information display equipment is situated in a position that is far from the photographing portion 11 and may be the one that receives the information photographed by the photographing portion 11 and then displays it on the display portion 16. Furthermore, the information display equipment may be the one that the display portion 16 is positioned far from the information display equipment. Examples of the information display equipment are dual-screen handheld game console, single-screen handheld game console, mobile phone, camera, mobile personal computer, and mobile terminal.

The photographing portion 11 is a device to photograph an object. An example of the photographing portion 11 is camera. An example of the camera is charge-coupled device (CCD) camera. The CCD camera uses, for example, moving picture photographing mode. In this case, for example, a photogenic object is photographed every 1/30 seconds, and then they are consecutively memorized in image memory portion such as video memory.

The dictionary 12 is an electronic dictionary to memorize information with respect to plural characters. Examples of the dictionary are English-Japanese dictionary, Japanese-English dictionary, Japanese dictionary, geographical dictionary, and name dictionary.

It is preferable for the dictionary 12 to have database depending on a kind of object. Examples of the kind of object are document, notebook, poster, atlas, game screen, doll, nameplate, and signboard.

The object distinction portion 13 is a device to distinguish a kind of object photographed by the photographing portion 11.

The object distinction portion 13 may be the one that distinguishes the kind of object by using color information of part of the object except characters. The object distinction portion 13 may be the one that distinguishes the kind of object by using not only the color information of the part of the object except the characters but also the color information of the characters.

This object distinction portion 13 has, for example, a table which connects the color of the part except the characters with the kind of object. Then the information with respect to the kind of object is retrieved from the table, based on the color information of the part except the characters. In addition, another example of this object distinction portion 13 has a table which connects the color of the characters and the color of the part except the characters with the kind of object. Also in this case, the character part is distinguished from the object that the photographing portion 11 has photographed, and then the color of the character part and the color of the part except the characters are distinguished. Then the information with respect to the kind of object is extracted from the table by using the provided color information.

The object distinction portion 13 may be the one that distinguishes the kind of object, based on direction of the photographing portion 11. For example, the information display equipment has a compass. The compass is the one that grasps the direction of the information display equipment. If the direction of the information display equipment is grasped, the direction of the photographing portion 11 can be also grasped. In other words, this object distinction portion 13 is the one that comprises the compass, a direction judgment portion that judges the direction of the photographing portion 11, based on the information from the compass, and the table that associates and memorizes the direction of the photographing portion 11 with the kind of object. The direction judgment portion that has received the information from the compass distinguishes the direction of the information display equipment and the direction of the photographing portion. Then this object distinction portion 13 distinguishes the kind of object from the table, based on the obtained direction of the photographing portion. In this way, the object can be easily inferred.

The object distinction portion 13 may be the one that distinguishes the kind of object, based on input information. For example, a display to let the display portion 16 select the kind of object is displayed. In addition, the display portion 16 is a touch panel. Then, the user selects the kind of object by using the touch panel. Then, the information with respect to the kind of object from the touch panel is inputted into the information display equipment. Then the information display equipment performs processing as mentioned later, using the information with respect to the inputted kind of object.

The object distinction portion 13 may be the one that distinguishes the kind of object, based on distance between the photographing portion 11 and the object. The camera usually has distance measurement means to measure the distance to the object. Then this object distinction portion 13 has such distance measurement means. The kind of object can be distinguished, by distinguishing, for example, the object at great distant to be signboard, because it has the distance measurement means.

The character distinction portion 14 is a device to distinguish the characters included in the object photographed by the photographing portion 11. An example of the character distinction portion 14 is OCR or OMR.

The information extraction portion 15 is a device to extract the information corresponding to these characters based on the kind of object and the characters from the dictionary 12.

The display portion 16 is a device to display the information corresponding to the characters extracted by the information extraction portion 15.

Next, a behavior example of the information display equipment as mentioned above is explained as follows. At first the photographing portion 11 photographs the object. This photographing is carried out consecutively. Photographing frequency is, for example, 1/30 seconds. Therefore, the photographing portion 11 photographs the different part of the photogenic object at the moment the information display equipment slightly moves. Then the image which the photographing portion 11 has photographed is conveyed to an image processing portion 31. Then the image processing portion 31 analyzes the information received from the photographing portion 11 and processes it so that the image can be displayed on the display portion 16. The image processing portion 31 consecutively conveys the image information received from the photographing portion 11 to an image storage portion 32 such as video memory, and the image storage portion 32 temporarily memorizes the image information.

On the other hand, the image that the image processing portion 31 has processed is conveyed to a judgment portion 33. The OCR and OMR are included in the judgment portion 33. Then the OCR or OMR distinguishes characters included in the image. The character distinction processing with the OCR and the OMR has been already known.

In addition, the distinction portion 33 distinguishes a kind of object. The object distinction portion 13 that is included in the distinction portion 33, for example, distinguishes the kind of object by using color information of the part of the object except the characters and a table. An example of the part except the characters is background color of the characters of the object. In this case, the distinction portion 33 has the table that connects the color information of the part except the characters in the object with the kind of object. Then, the information with respect to the kind of object is retrieved from the table, based on the color information of the part except the characters. This example is the one that if the background color of the characters ranges from white to cream, the object is determined to be document. The information distinguished in the distinction portion 33 is appropriately memorized in a distinction information storage portion 34.

The information extraction portion 15 selects a database, which corresponds to the kind of object, in the dictionary 12, using the information with respect to the kind of object. In other words, the dictionary has plural databases corresponding to the kind of object. The information extraction portion 15 selects a database, which corresponds to the kind of object, in the dictionary 12, using the information with respect to the kind of object. In addition the information extraction portion 15 extracts the information corresponding to these characters from the database, which is selected based on the characters.

The information that the information extraction portion 15 extracted is adjusted to the one that is displayed on the display portion 16 in an image adjustment portion 34. Then the display portion 16 which has received the display information from the image adjustment portion 34 displays appointed information before the next photographing image is photographed. From this, this information display equipment can consecutively display appropriate correspondence information (e.g., translation) with respect to target words in real time, and real-time response is enabled.

The operation mentioned above is carried out based on control command from a control portion 41. For example, when the appointed information is inputted into the control portion 41 from an input portion 42, the control portion 41 retrieves control program from a main memory memorized in a main storage portion 43. Then the control portion 41 lets various operation portions perform appointed arithmetic processing based on the instruction from the control program retrieved. In addition, the control portion 41 outputs the obtained result of operation from the display portion 16 and an output portion 44.

Figure 2:
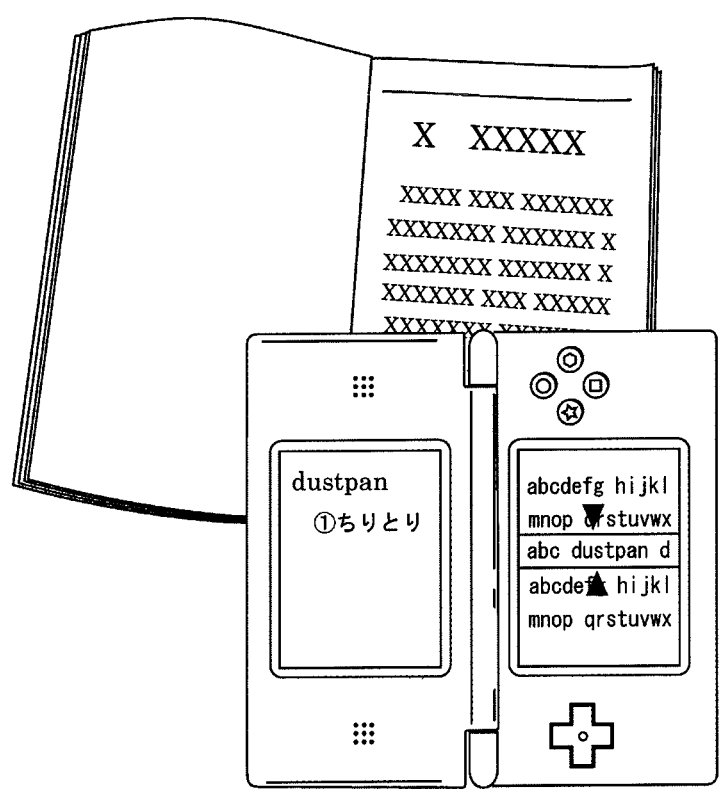
FIG. 2 illustrates a display example using the information display equipment.

FIG. 2 illustrates a display example using the information display equipment. This example is the one in the case that the information display equipment is two-screen handheld game console. In this example, an English book is photographed, using the camera of the game console. Then the information display equipment recognizes that the photographing object is document. On the right screen, a page of the English book photographed by the camera is displayed. Then, on the right screen, designation display of target word to be translated is performed to extract the word that is targeted for translation.

Then, on the left screen, suitable parts of the English-Japanese dictionary corresponding to a word targeted for translation, which is appointed on the right screen, are displayed. In the example as shown in FIG. 2, it is not necessary to appoint a translated term, and a word to exist in translation region is automatically translated while the English book is consecutively photographed by the camera. On the other hand, because the word targeted for translation changes when the information display equipment moves, the situation that the word targeted for translation changes may be prevented by pushing either of input buttons. In this case, the information display equipment which has received input from either button may process so as to continue to display the word that is displayed presently ("dustpan" in the case of FIG. 2).

In the example as shown in FIG. 2, on the right screen, a region targeted for translation is appointed. On the other hand, the region targeted for translation may be able to appropriately move using a cross key shown in FIG. 2. In this case, the instruction that the region targeted for translation moves is inputted into the information display equipment with the cross key. Then the information display equipment performs not only arithmetic processing to move the region targeted for translation, but also display processing to display the region targeted for translation after the monitor has moved based on the instruction from the control program.

Figure 3:
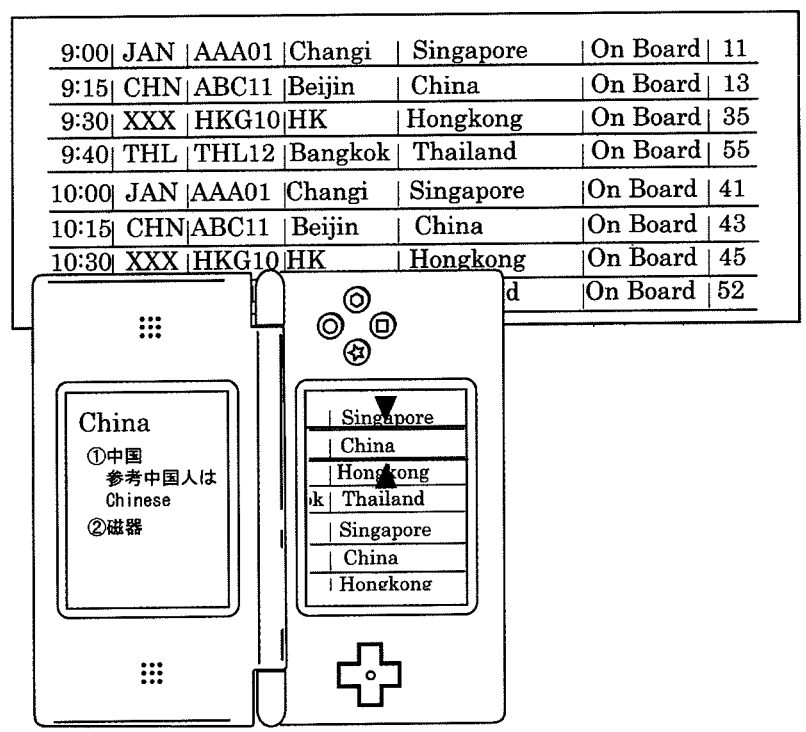
FIG. 3 illustrates a display example using the information display equipment.

FIG. 3 illustrates a display example, using the information display equipment. This example copies an airport display board by using a game console camera. In this example, a part of the English-Japanese dictionary corresponding to the selected word "China" on the right screen is displayed on the left screen. In this example, the user turns the photographing portion not downward but upward to photograph the display board. Then, the compass that is included in the information display equipment senses that the direction of the photographing portion is upward and conveys it to the control portion. Then the control portion receives the instruction of the control program and make the object distinction portion 13 distinguish the object. As a result, the object distinction portion 13 judges that the object is not documentation based on the information that the angular degree of the photographing portion is more than a specified value. Then the information extraction portion 15 selects a database in the dictionary 12, based on the information that the object is not the documentation. In addition, an appropriate dictionary part may be extracted and displayed.

Figure 4:
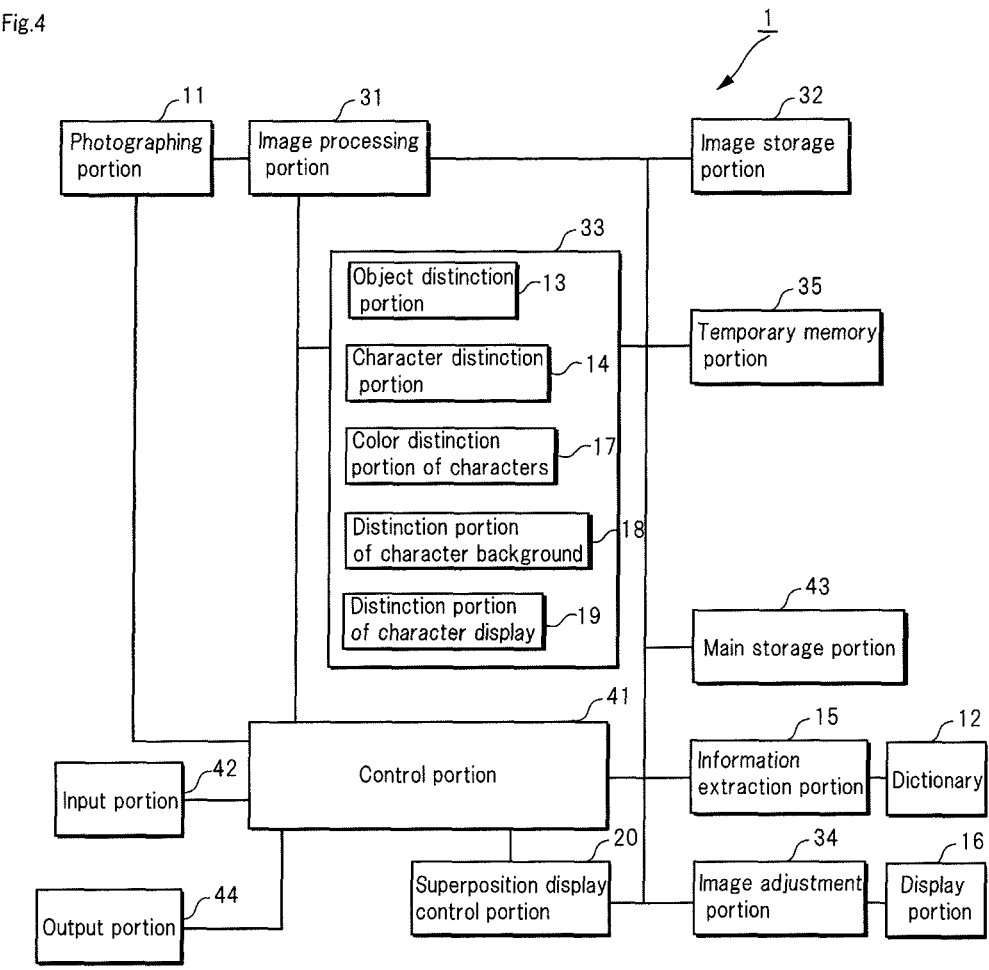
FIG. 4 illustrates a block diagram to explain an information display equipment of the present invention which is different from the above.

FIG. 4 is a block diagram to explain an information display equipment of the present invention which is different from the above mentioned. As shown in FIG. 4, this information display equipment 1 includes a photographing portion 11, a dictionary 12, an object distinction portion 13, a character distinction portion 14, an information extraction portion 15, a display portion 16, a distinction portion of character color 17, a distinction portion of character background 18, a distinction portion of character display 19, and a control portion of superposition display 20.

The explanation of the same elements as FIG. 1 in the information display equipment shown in FIG. 4 is omitted by referring to the description. However, in this information display equipment, character information may not be extracted based on a kind of object.

The distinction portion of character color 17 is a device to distinguish the character color. For example, color code is an identification means to distinguish color of code information. For example, in the present invention the character color can be distinguished by using a color distinction device used for the color code.

The distinction portion of character background 18 is a device to distinguish the color around the characters in the object. If the characters are inferred by using OCM or OMR, the part except the characters in the object appears. The part except the characters in this object is the color around the characters. This color around the characters can be also distinguished by using a known device.

The distinction portion of character display 19 is a device to distinguish position, dimension and angular degree in the display portion of character 16. Because the OCR and OMR should be able to usually distinguish characters, this information is thrown away after the information about the position, the dimension, the angular degree of the characters has been obtained. In the present invention, the information about the position, the dimension, and the angular degree of the characters is obtained and memorized in a storage portion. Then when translated words are superposed on the characters, the information about the position, the dimension, the angular degree of the characters before translating are used.

A superposition display control portion 20 is a device to display the information corresponding to the characters in piles on the object displayed on the display portion 16.

Figure 5B:
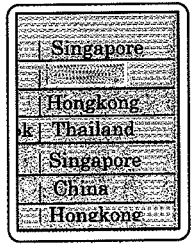
FIG. 5 illustrates a diagram to explain superposition display.
Figure 5C:
Figure 5D:
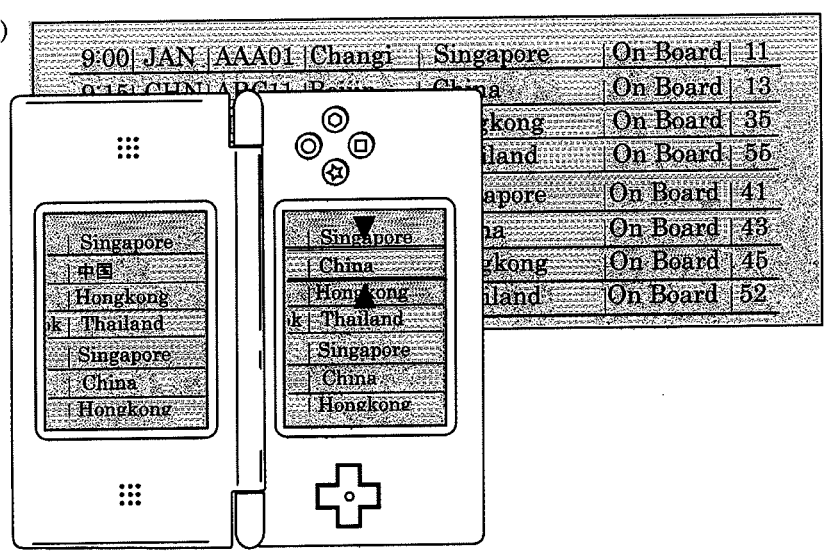

FIG. 5 is a diagram to explain the superposition display. FIG. 5 (*a*) shows a display plate which is not via the information display equipment. The information display equipment photographs scenery in the airport where this display plate exists. Then the information display equipment recognizes the characters "China" included in the display plate. Furthermore the information display equipment grasps the position, the dimension, and the angular degree of this character in the display portion 16. This information is memorized in a temporary memory portion 35. Then the information display equipment judges that photographing object is not documentation based on the direction of the information display equipment, and selects a place dictionary and a name dictionary as a dictionary for translation. In addition, the information display equipment selects "中国" from the place dictionary as a translated word corresponding to the word "China". When a normal dictionary is used, the sense of porcelain and/or china arises from China. In this case, because the word has been selected from the place dictionary, the situation that the porcelain is displayed as a translated word of "China" can be prevented.

Next, a control portion of superposition display 20 covers area including the part of "China" with the color of the display plate so that these characters "China" disappear. In this case, the control portion of superposition image 20 obtains the color information of character background (the part around the characters in the object) from the distinction portion of character background 18. Then appropriate color information to cover the characters is provided from the storage portion. Furthermore, the control portion of superposition image 20 obtains information about the position and the dimension of the characters in the display portion 16 from the distinction portion of character display. Then the control portion of superposition image 20 determines polygon covering the characters by using the information about the position and the dimension of the characters in the display portion 16, and superimposes the polygon having the color determined earlier to the characters. By doing so, the characters spuriously disappear. FIG. 5 (*b*) is a conceptual diagram when the characters are covered by the background color.

Then the control portion of superposition display 20 displays the characters of "中国" corresponding to the position, the dimension, and the angular degree of "China" in the display plate, by using the information about the position, the dimension, and the angular degree of "China" in the display plate. FIG. 5 (*c*) illustrates a state that the characters of "中国" are displayed by substituting "China" in the display plate. As explained earlier, "中国" is selected as a translation of "China". Then the control portion of superposition image 20 obtains information about the position and the dimension of the characters in the display portion 16 from the distinction portion of character display. The control portion of superposition image 20 performs arithmetic processing so that the word of "中国" corresponds to the position and the angular degree of the obtained characters. Furthermore, the control portion of superposition image 20 performs arithmetic processing so that the word of "中国" fits into the polygon that has been earlier used to cover the characters. By doing so, translated words can be displayed without the sense of incongruity. FIG. 5 (*d*) illustrates a state that the characters have been translated in the display plate. In addition, in the example as shown in FIG. 5, only a single word is translated. However, for example, translated words about all the words displayed on a monitor may be displayed on the monitor. Also in this case, by taking similar processing as explained earlier, the translated words of all the words can be displayed on the monitor.

Figure 6:
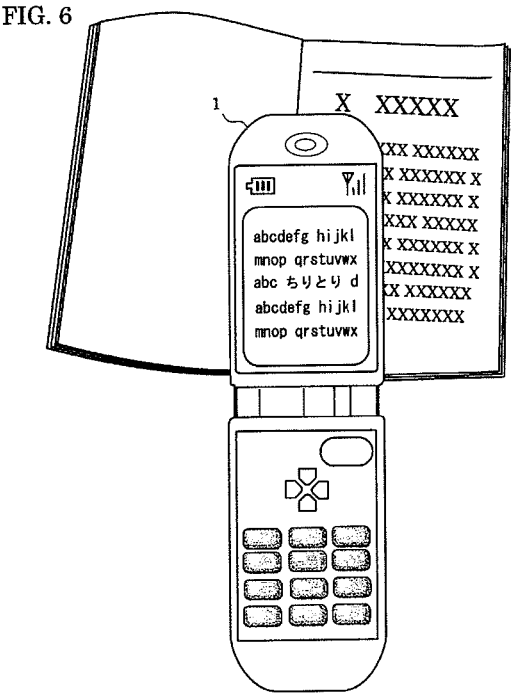
FIG. 6 illustrates a display example using the information display equipment.

FIG. 6 shows an example that the information display equipment of the present invention is implemented in mobile phone. In this example, "dustpan" in a composition is translated as "ちり とり" and it is displayed. In addition, this processing is similar to that of FIG. 5 as mentioned above.

Figure 7:
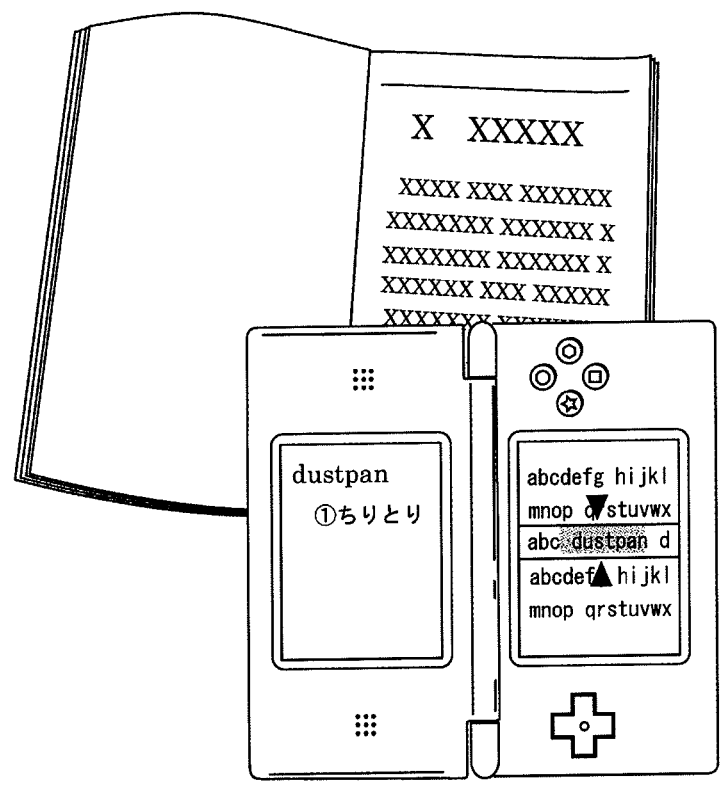
FIG. 7 illustrates a diagram to explain a behavior example of an information display equipment of the present invention which is different from the above.

FIG. 7 is a diagram to explain a behavior example of an information display equipment of the present invention which is different from the above mentioned. The display portion 16 in this information display equipment is a touch panel. Similarly to FIG. 2, English sentences are displayed on the right side screen of dual-screen game console. Then a static image that a photographing portion has photographed may be memorized and displayed on the right screen. In this example, a part of the English sentences is displayed. Then the user uses a touch pen and touches the touch panel. Then a word specified by the touch pen is selected. As shown in FIG. 7, a selected marker is displayed on the selected character part. When the characters in the English sentences are selected, correspondence parts of the English-Japanese dictionary which correspond to the English words are displayed on the left screen.

Figure 8:
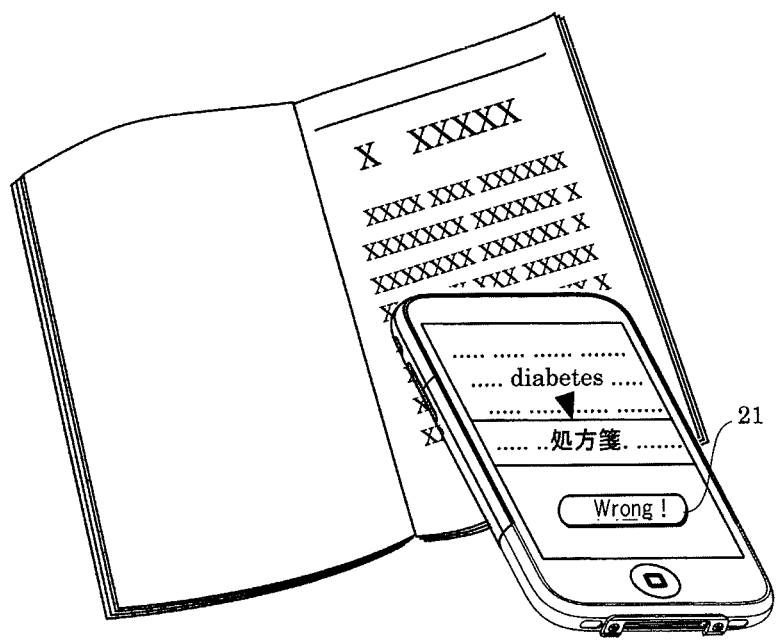
FIG. 8 illustrates a diagram to explain a behavior example of an information display equipment of the present invention which is different from the above.

FIG. 8 is a diagram to explain a behavior example of an information display equipment of the present invention which is different from the above mentioned. This information display equipment is the one that the information extraction portion 15 extracts one most appropriate word corresponding to the characters from the dictionary 12. As explained earlier, the most appropriate word may be extracted, by selecting a dictionary 12 by using the information about the kind of object. For example, if the object is other than books and there is a word corresponding to the place name dictionary as a dictionary 12, the word is given priority over a word to be provided from the other dictionary and may be judged to be the most appropriate word. The information display equipment in this aspect may extract the most appropriate word without using the information about the kind of object.

The dictionary 12 has, for example, plural translated words with respect to a certain word and may be the one that memorizes respective translated words together with the frequency in use. For example, as for a certain word "A", "あ", "い" and "う" are assumed to be stored as a translation in a dictionary. In this case, "あ", "い" and "う" are numbered the first, the second, and the third places, respectively. Then, for example, if the information display equipment in the present invention translates the word "A", the dictionary is accessed and the highest precedence "あ" may be displayed as the most appropriate word on the display portion. In addition, as mentioned later, if that "あ" is wrong is inputted into the information display equipment, the dictionary may be accessed and "い" that is the next in precedence to "あ" may be retrieved and displayed on the display portion.

The information display equipment of the present invention may be the one that has the co-occurrence database that has connected and memorized translated words and words having high frequency in use that are included in a composition. For example, the word "prescription" has translated words such as "処方う", "助言", "規則" and "時効". The co-occurrence database, for example, may store the words with respect to illness, medicine or drugstore ("diabetes", "drag", "medicament", "pharmacie") by associating the word "prescription" with the related "処方箋". By doing so, for example, if a target word for translation is "prescription" and the word with respect to the illness, medicine or drugstore exists in front and/or behind of "prescription", the information display equipment of the present invention extracts " 処方 箋 " as the most appropriate word. Other words are also similar. For example, "damage", "account of profit", "criminal offence", and so on may be stored in conjunction with " 時効 ".

The example as shown in FIG. 8 is the one that has translated a word "prescription" as the target word into "処方箋" and displayed it, by using the word "diabetes" included in the part that the camera has photographed.

When a target word is translated, this information display equipment memorizes words in the same row as the target word or words included in the portion photographed by the camera in the storage portion. Then the information display equipment retrieves terms related to the translation of the target word that are memorized in the dictionary. In addition, arithmetic processing is performed to judge whether the related terms are included in words memorized in the store portion. By doing so, co-occurrence judgment processing can be performed to select translated words.

In this way, this information display equipment can appropriately display only a translation of the target word. Therefore, immediately after the target word has changed, a translated word that appropriately corresponds to the target word after changing can be displayed in real time.

As shown in FIG. 8, the information display equipment in this aspect not only displays the most appropriate word but also performs display to promote the input of what the most appropriate word that has been displayed is wrong in the case that the displayed most appropriate word is wrong. In the figure, the sign 21 is display to promote the input of the most appropriate word being wrong.

By the processing as explained earlier, the most appropriate word is displayed on the display portion of the information display equipment. On the other hand, if the user judges that this translation is not appropriate, it is thought that the user wants that the next candidate for translation is displayed. This user, for example, touches the display 21 to promote the input of the most appropriate word being wrong. Then, because the display portion is an input portion of a touch panel type, the information about what the most appropriate word is wrong is inputted into the information display equipment. The control portion of the information display equipment that has received this input information accesses the dictionary 2 once again, retrieves a translation in the second-highest priority, and displays it in the display portion.

In addition, the present invention also provides program to functionalize computer as the information display equipment as mentioned above, the computer and readable information recording medium that has stored the program. In addition, the present invention also provides processing method by the information processing unit as mentioned above.

Figure 9:
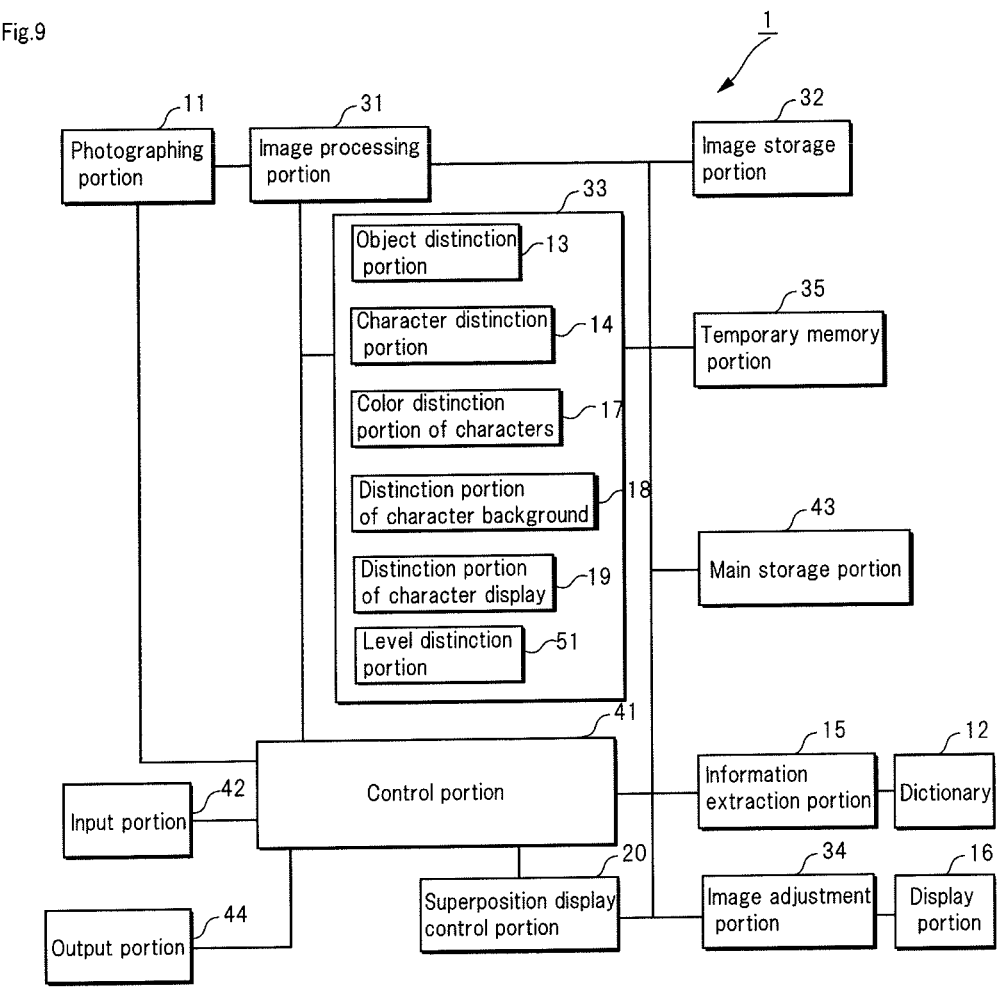
FIG. 9 illustrates a block diagram to explain an information display equipment pertaining to a further embodiment of the present invention.

A further improved embodiment of the present invention is explained by using FIG. 9 as follows. As stated above, the present invention relates to a camera dictionary that is able to response in the real time and that can display consecutively and automatically new terms for translation immediately after the image that the camera catches is changed. However, when the terms for translation about all the words photographed by the camera are displayed on a screen, the throughput speed in the computer did not catch up with it, and there is a problem to be improved which the display of the term for translation is delayed. In other words, the processing that a word is photographed by camera, the photographed word is distinguished before a translated word is displayed, the translated word of the distinguished word is extracted from the dictionary, and then the translated word extracted is display on the display device, is performed. In particular, the processing of extracting a translated word of a photographed word from the dictionary is complicated and requires relatively long hours. Therefore, it is required that only a translated word that the user requires is extracted from the dictionary and displayed.

In addition, the speed that words are consecutively photographed by the present invention varies according to the linguistic ability of a user. Particularly, because the user having high linguistic ability can read documents at high speed, the speed to photograph words by the present invention is also fast. Therefore, there was a problem to be improved that computer-aided translation process did not catch up with the speed that the user reads documents. Then, the information display equipment is required that translated words can be displayed in timing depending on the ability of the user.

In view of the above-mentioned points, a further embodiment of the present invention intends to provide the information display equipment that can display only translated words that a user requires depending on the ability of the user. In other words, the intention of the further embodiment of the present invention is to settle to improve throughput speed in the whole computer by displaying only the translated words that the user requires.

To solve the problem mentioned above, a further embodiment of the present invention has the following configurations. Namely, the further embodiment of the present invention, as shown in FIG. 9, is an information display equipment comprising a photographing portion (11) to photograph an object, a dictionary (12) that memorizes information with respect to plural characters and has a degree-of-difficulty database that has classified the information with respect to each character, depending on degree of difficulty, a object distinction portion (13) to distinguish a kind of object photographed by the photographing portion (11), a character distinction portion (14) to distinguish the characters included in the object photographed by the photographing portion (11), a level distinction portion (51) that distinguishes linguistics level of a user who has photographed the object by the photographing portion (11), by analyzing each character distinguished by the character distinction portion (14), based on the degree-of-difficulty database included in the dictionary (12), and by determining each degree of difficulty of the characters a database selection portion (52) that selects a degree-of-difficulty database included in the dictionary (12), depending on the user's linguistics level determined by the level distinction portion (51), an information extraction portion (15) that extracts the information corresponding to these characters from the degree-of-difficulty database selected by the database selection portion (52), based on the kind of object distinguished by the object distinction portion (13) and the characters distinguished by the character distinction portion (12), and a display portion (16) to display the information corresponding to the characters extracted by the information extraction portion (15).

By having such a configuration, the further embodiment of the present invention extracts only translated words that the user requires depending on the linguistics level of the user from the dictionary and can display it on the display device. Therefore, as for translated words that the user does not require, because it is not required to extract them from the dictionary, throughput speed in the whole computer can be improved.

The further embodiment of the present invention is explained in more detail as follows. However, description about overlapping parts with the above-mentioned embodiment is omitted. Therefore, the same configuration as the above-mentioned embodiment can be appropriately adopted in the further embodiment of the present invention.

The dictionary 12 memorizes the information with respect to plural characters. Furthermore, the dictionary 12 has a degree-of-difficulty database in which the information with respect to each character is classified depending on a degree of difficulty. In the degree-of-difficulty database, respective characters are classified depending on a degree of difficulty, and, for example, English words are classified into beginner level, intermediate level, and advanced level and, the degree of difficulty of the characters may be classified into two levels or may be classified into three levels or more than three levels. In addition, it is preferable that digit values depending on the degree of difficulty are memorized with respect to each of plural characters in the degree-of-difficulty database. The digit values depending on the degree of difficulty of the character are used in processing to judge the level of the user who has photographed the object. For example, the word that the degree of difficulty is classified into the beginner level is assigned to digit value 1, the word classified into the intermediate level is assigned to digit value 2, the word classified into the advanced level is assigned to digit value 3. In addition, for example, about words classified into beginner, these may be assigned to digit values 1.0-1.9 depending on the degree of difficulty furthermore. In addition, words that appear in documentation a lot and that necessity to display their translated words is low is not assigned by any digit value or may be assigned by digit value zero. For example, examples of words having low necessity to display translated words are particles, articles, auxiliary verbs, and conjunctions. In addition, numeric value assigned to each of the characters can be appropriately changed and is not limited to the examples as stated above.

In addition, as for the degree-of-difficulty database, it is preferable that the number of the characters to memorize tends to decrease as the degree of difficulty is improved. Concretely, in the degree-of-difficulty database in which the degree of difficulty is high, it is desirable that the configuration that the characters of high degree of difficulty among characters memorized in the degree-of-difficulty database in which the degree of difficulty is low are memorized. In other words, more words are memorized in the degree-of-difficulty database in which the degree of difficulty is low, and fewer words are memorized in the degree-of-difficulty database in which the degree of difficulty is high.

In addition, each degree-of-difficulty database classifies and memorizes plural characters depending on a kind of object. Examples of the kind of object are document, notebook, poster, atlas, game screen, doll, nameplate, and signboard.

A further embodiment of the present invention has a level judgment portion 51 judging linguistics level of the user who has photographed the object by the photographing portion 11. The level judgment portion 51 decides each degree of difficulty of characters included in the object photographed by the user, based on the degree-of-difficulty database included in the dictionary 12, and judges the linguistics level of the user by grasping the degree of difficulty of the words that the user requires to translate. For example, if many characters included in the object photographed by the user are assigned to the beginner level in the degree-of-difficulty database, the level of the user can be judged to be the beginner level. The information with respect to the user's linguistics level judged by the level judgment portion 51 is memorized in the storage portion.

More specifically, the level judgment portion 51 decides the degree of difficulty about all the characters distinguished by a character distinction portion 14. Then, a digit value depending on the degree of difficulty memorized in the degree-of-difficulty database is used as a degree of difficulty of the characters. For example, if the number of the characters distinguished by character distinction portion 14 is 10, the digit value corresponding to the degree of difficulty with respect to each of these 10 characters is provided from the degree-of-difficulty database. Then, the digit values corresponding to the degree of difficulty of respective characters are added up. Then, this total number is divided by the number of the characters, and the mean value of the degree of difficulty of the characters distinguished by the character distinction portion 14 is provided. The level distinction portion 51 can judge level depending on the mean value of the degree of difficulty of the characters provided in this way to be the linguistics level of the user. The information about the number of the characters which have been used to judge the linguistics level of the user by the character distinction portion 51, the digit values depending on the degree of difficulty of the characters, and the numerical mean value depending on the degree of difficulty of the characters is memorized in the storage portion.

In addition, the level distinction portion 51 may update information about the linguistics level of the user which is memorized in the storage portion whenever the characters are distinguished by the character distinction portion 14. In this way, the information about the linguistics level memorized in the storage portion can be changed depending on change of the linguistics ability of the user. In addition, the linguistics level of the user memorized in the storage portion may be provided as the one that the user chooses optionally.

A further embodiment of the present invention has a database selection portion 52 that selects a degree-of-difficulty database included in the dictionary 12, depending on the linguistics level of the user judged by the level distinction portion 51. As mentioned above, the degree-of-difficulty database, in which information with respect to each character is classified depending on the degree of difficulty, is included in the dictionary 12. Then the degree-of-difficulty database depending on the linguistics level of the user judged by the level distinction portion 51 is selected among the dictionary 12. For example, in the event that the linguistics level of the user is judged to be the beginner level by the level distinction portion 51, the database selection portion 52 selects a degree-of-difficulty database that memorizes the characters depending on the beginner linguistic level.

Then, in a further embodiment of the present invention, based on a kind of object distinguished by the object distinction portion 13 and the characters distinguished by the character distinction portion 12, an information extraction portion 15 extracts the information corresponding to these characters from the degree-of-difficulty database selected by the database selection portion 52. Because the information corresponding to the characters is classified into a kind of object and is memorized in the degree-of-difficulty database, the information extraction portion 15 can extract the translated word of the characters depending on the kind of object. In particular, as the degree of difficulty increases, the degree-of-difficulty database becomes to have a small number of the memorized characters. Even if the characters are distinguished by the character distinction portion 12, the information extraction portion 15 does not extract translated words with respect to the characters which are not memorized in the selected degree-of-difficulty database. In other words, if the linguistics level of the user is high, the number of the translated words extracted by the information extraction portion 15 becomes to decrease. On the other hand, in the degree-of-difficulty database, the number of the characters which are memorized increases as the degree of difficulty decreases. In other words, if the linguistics level of the user is low, the number of the translated words extracted by the information extraction portion 15 becomes to increase.

From this, in the further embodiment of the present invention, only translated words that the user require can be displayed. In other words, for the user having high linguistic ability, only a few translated words that the user requires can be displayed in a fast speed. On the other hand, for the user having low linguistic ability, many translated words that the user requires can be displayed in a slow speed. Therefore, the further embodiment of the present invention can appropriately display the translated words that the user requires depending on the ability of the user.

INDUSTRIAL APPLICABILITY

The present invention can be effectively used as a learning equipment and/or a tool for travel.

DESCRIPTION OF SIGNS

1 Information display equipment
11 Photographing portion
12 Dictionary
13 Object distinction portion
14 Character distinction portion
15 Information extraction portion
16 Display portion
17 Color distinction portion of characters
18 Distinction portion of character background
19 Distinction portion of character display
31 Image processing portion
32 Image storage portion
33 Distinction portion
34 Image adjustment portion
35 Temporary memory portion
41 Control portion
42 Input portion
43 Main storage portion
44 Output portion
51 Level distinction portion
52 Database selection portion

The invention claimed is:

1. An information display equipment comprising:
a photographing portion to photograph an object;
a dictionary that memorizes information with respect to plural characters;
an object distinction portion to distinguish a kind of object photographed by the said photographing portion;
a character distinction portion to distinguish the characters included in the object photographed by the said photographing portion;
an information extraction portion that extracts information corresponding to the characters from the said dictionary, based on the kind of object distinguished by the said object distinction portion and the characters distinguished by the said character distinction portion; and
a display portion to display the information corresponding to the characters extracted by the said information extraction portion,
wherein the said object distinction portion is the one that has a compass that judges direction of the said photographing portion, a direction decision portion that judges, based on information from the said compass, direction of the said photographing portion, and a table that associates and memorizes the direction of the said photographing portion with a kind of object, and distinguishes, based on the direction of the said photographing portion, the kind of object,
the said dictionary is a dictionary having databases depending on the kind of object, and
the said information extraction portion selects a database depending on the kind of object included in the said dictionary, using the kind of the object distinguished by the said object distinction portion,
based on the characters distinguished by the said character distinction portion, the information corresponding to these characters is extracted from the selected database.

2. The information display equipment in accordance with claim 1, wherein
the said display portion is the one that displays the object photographed by a photographing portion and includes a character color distinction portion distinguishing color of the said characters, a character background distinction portion distinguishing the color around the said characters in the said object, a character display distinction portion distinguishing position, dimension, and angular degree in the said display portion of the said characters, and a superposition display control portion to display the information corresponding to the said characters in piles on the object displayed on the said display portion,
the said superposition display control portion displays the information corresponding to the said characters, based on position, dimension, and angular degree in the said display portion of the said characters distinguished by the said character display distinction portion and the color of the said characters distinguished by the said character color distinction portion,
color around the said characters is displayed, based on the color around the said characters in the said object distinguished by the said character background distinction portion, so that the said characters are not displayed on the said display portion.

3. The information display equipment in accordance with claim 1, wherein
the said display portion is the one that displays the object photographed by the photographing portion,
the said display portion is a touch panel, and
the said character distinction portion identifies and distinguishes the said characters, based on designation information from the said touch panel.

* * * * *